United States Patent [19]

Dan

[11] Patent Number: 5,752,893

[45] Date of Patent: May 19, 1998

[54] DRIVING FORCE TRANSMITTING APPARATUS FOR HEADPHONE STEREO MECHANISM

[75] Inventor: Byung Ju Dan, Seoul, Rep. of Korea

[73] Assignee: LG Electronics, Inc., Seoul, Rep. of Korea

[21] Appl. No.: 571,102

[22] Filed: Dec. 12, 1995

[30] Foreign Application Priority Data

Dec. 14, 1994 [KR] Rep. of Korea ............... 34000/1994

[51] Int. Cl.$^6$ .............................. F16H 7/02; F16H 7/24
[52] U.S. Cl. .................. 474/150; 474/148; 474/273; 242/356.7; 74/665 GE
[58] Field of Search ................. 474/139, 148, 474/149, 150, 152, 153; 74/89.22, 665 GE; 242/349, 356, 356.5, 356.7

[56] References Cited

U.S. PATENT DOCUMENTS

| | | | |
|---|---|---|---|
| 3,026,737 | 3/1962 | Berg | 74/229 |
| 3,782,656 | 1/1974 | Broghammer | 242/201 |
| 5,041,930 | 8/1991 | Tsuchiya | 360/96.5 |
| 5,375,789 | 12/1994 | Kunze et al. | 242/356 |

FOREIGN PATENT DOCUMENTS 5001750  1/1993  Japan ........................... 474/148

OTHER PUBLICATIONS

Berg, W.M., "Plastic Transmission Belts with Geared Pulleys", Engineering Materials and Design, Heywood Publication, undated.

*Primary Examiner*—Tamara L. Graysay
*Assistant Examiner*—Gary S. Hartmann

[57] ABSTRACT

An improved driving force transmitting apparatus for a headphone stereo mechanism capable of reducing the number of parts necessary for transmitting the driving force is disclosed. The apparatus provides an idler engaged to a motor-side gear for increasing a driving force efficiency. The apparatus includes a motor having a drive gear disposed at a central shaft thereof and disposed at the lower surface of a main base, an idler gear intermeshed with the drive gear and having an idler pulley, and a reverse capstan pulley and a forward capstan pulley rotatable by a belt directly connected to the idler pulley of the idler gear.

11 Claims, 3 Drawing Sheets

DRIVING FORCE TRANSMITTING APPARATUS FOR HEADPHONE STEREO MECHANISM

BACKGROUND OF THE INVENTION

1. Field of the Invention

The present invention relates to a driving force transmitting apparatus for a headphone stereo mechanism, and in particular to an improved driving force transmitting apparatus for a headphone stereo mechanism capable of advantageously reducing the number of parts necessary for transmitting a driving force to a corresponding element by providing an idler engaged to a motor-side gear, thus increasing the driving force efficiency.

2. Description of the Conventional Art

Conventionally, the driving force transmitting apparatus for a headphone stereo mechanism, as shown in FIG. 1, includes a motor 1 disposed at the lower surface of a main base 50. An idler pulley 5 is spaced apart from the motor 1 at the upper side of the motor 1, and a reverse capstan pulley 3 is slightly spaced apart from the idler pulley and disposed on the right side of the idler pulley 5. In addition, a forward capstan pulley 4 is spaced part from the reverse capstan pulley 3 at the right side of the reverse capstan pulley 3.

In addition, a drive pulley 1a is disposed on a central shape of the motor 1. The drive pulley 1a, the idler pulley 5, the reverse capstan pulley 3 and the forward capstan pulley 4 are drivingly connected by an endless belt 2.

Here, the drive pulley 1a, the idler pulley 5, and the forward capstan pulley 4 come into contact with the inner surface of the belt 2 whereas the reverse capstan pulley 3 comes into contact with the outer surface of the belt 2.

Meanwhile, the driving force transmitting apparatus of a conventional stereo mechanism may be connected to another driving force transmitting apparatus so as to rotate a certain element such as a reel table.

The operation of the conventional driving force transmitting apparatus for a headphone stereo mechanism will now be explained with reference to FIG. 1.

To begin with, when the motor 1 is driven by a certain driving force transmitted thereto, the driving force of the motor 1 is transmitted to the idler pulley 5, the reverse capstan pulley 3, and the forward capstan pulley 4 in order by the belt 2. The reverse capstan 3 rotates in the reverse direction with respect to the rotation direction of the motor 1, and the forward capstan pulley 4 rotates in the same direction as the motor 1, so that the forward capstan 4 and the reverse capstan pulley 3 have the opposing rotation directions.

However, the conventional driving force transmitting apparatus for a conventional headphone stereo mechanism has disadvantages in that it requires at least four belt-driven elements including the motor in order to allow the reverse capstan pulley and the forward capstan to rotate in opposite directions. In addition, since all of the above-mentioned rotation elements are connected by the belt, the driving force is applied to all four elements, causing loss of the driving force in the mechanism.

Moreover, since a certain side force is applied to the motor, the loss of the driving force is increased.

SUMMARY OF THE INVENTION

Accordingly, it is an object of the present invention to provide a driving force transmitting apparatus for a headphone stereo mechanism, which overcomes the above and other problems encountered in a conventional driving force transmitting apparatus for a headphone stereo mechanism.

It is another object of the present invention to provide an improved driving force transmitting apparatus for a headphone stereo mechanism capable of reducing the number of parts necessary for transmitting the driving force by providing an idler gear engaged to a motorside gear, thus increasing a driving force efficiency.

To achieve the above and other objects, there is provided a driving force transmitting apparatus for a headphone stereo mechanism, which includes a motor having a driving gear disposed on a central shaft thereof and disposed at the lower surface of a main base; an idler gear having a pulley and intermeshed with the driving gear; and a reverse capstan pulley and a forward capstan pulley connected by a belt through the pulley of the idler.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PREFERRED EMBODIMENTS

Figure 1:
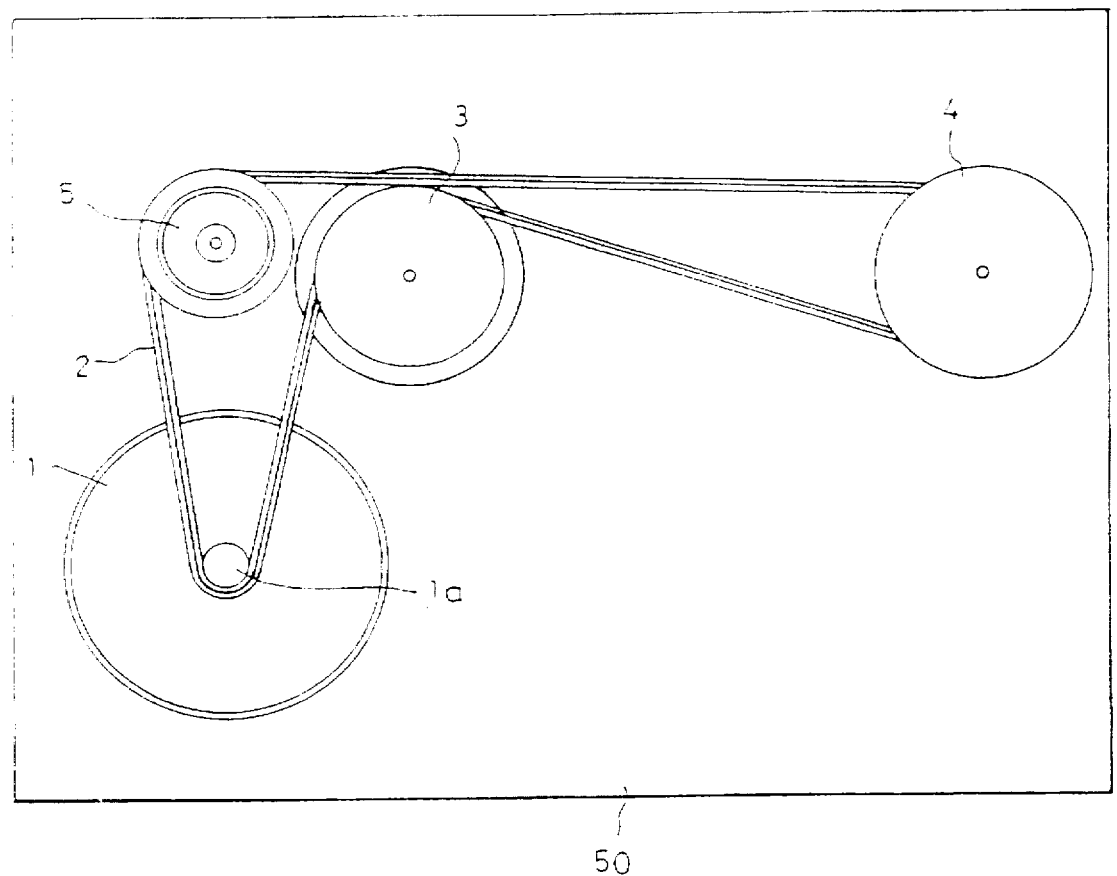
FIG. 1 is a conventional top view showing a driving force transmitting apparatus for a headphone stereo mechanism.
Figure 2:
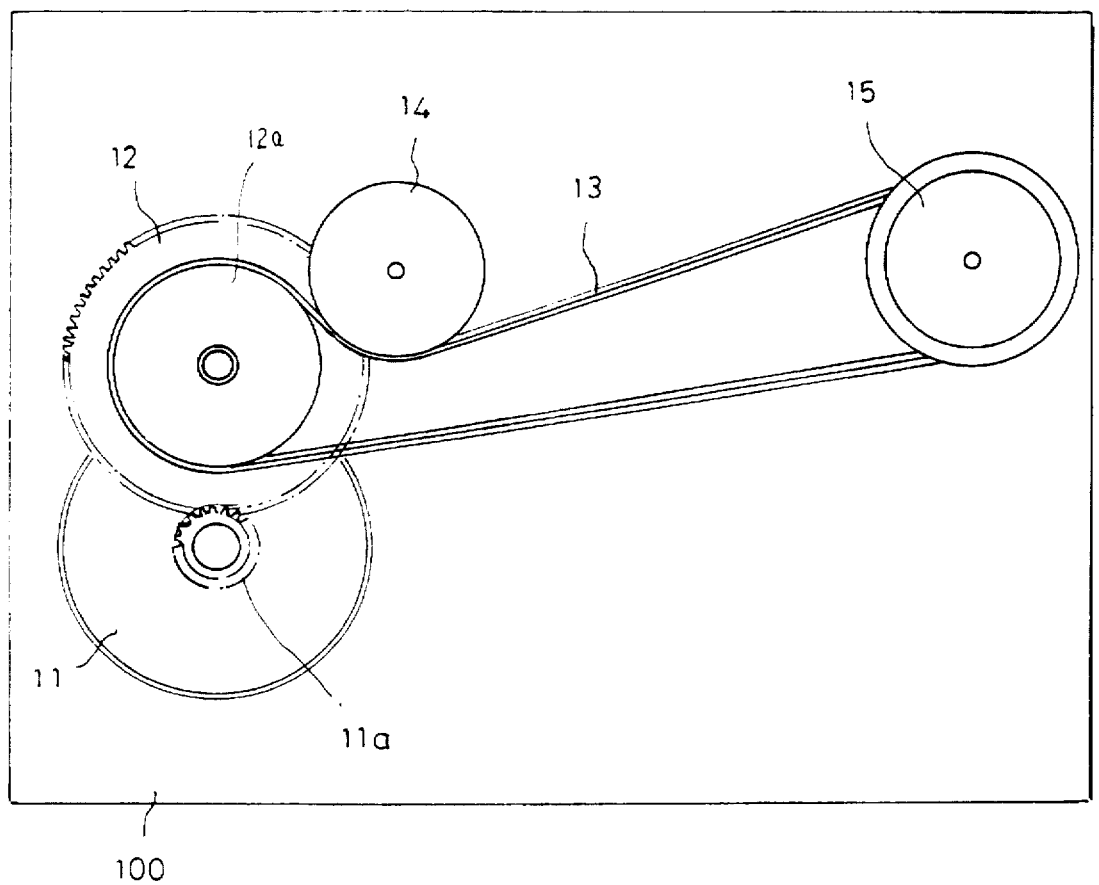
FIG. 2 is a top view of a driving force transmitting apparatus for a headphone stereo mechanism according to a first embodiment of the present invention.

Referring to FIG. 2, a driving force transmitting apparatus for a headphone stereo mechanism of according to the first embodiment of the present invention includes a motor 11 disposed at the lower surface of a main base 100. In addition, a drive gear 11a is disposed on a central shaft of the motor 11. In addition, an idler gear 12 having a an idler pulley 12a coaxially disposed on the upper surface thereof is intermeshed with the drive gear 11a.

In addition, a reverse capstan pulley 14 is disposed at the right side of the idler gear 12, and a forward capstan pulley 15 is disposed at the right side of the reverse capstan pulley 14. Here, the reverse capstan pulley 14 is slightly spaced apart from the idler pulley 12a of the idler gear 12.

The idler pulley 12a of the idler gear 12, the reverse capstan pulley 14 and the forward capstan pulley 15 are drivingly connected by a belt 13 in order. The reverse capstan pulley partially cover the idler gear 12, as shown in FIG. 2.

Here, the idler pulley 12a of the idler gear 12 and the forward capstan pulley 15 come into contact with the inner surface of the belt 13, whereas the reverse capstan pulley 14 comes into contact with the outer surface of the belt 13.

The operation of the driving force transmitting apparatus for a headphone stereo mechanism of according to the first embodiment of the present invention will now be explained with reference to FIG. 2.

To begin with, when the motor 11 rotates, the idler gear 12 intermeshed with the gear 11a rotates, and the driving force of the idler gear 12 is transmitted to the reverse capstan pulley 14 and the forward capstan pulley 15 by the belt 13. The reverse capstan 14 rotates in the same direction as the motor 11 rotates. In addition, the forward capstan pulley 15 rotates in the opposing direction to the rotation direction of the motor 11.

Figure 3:
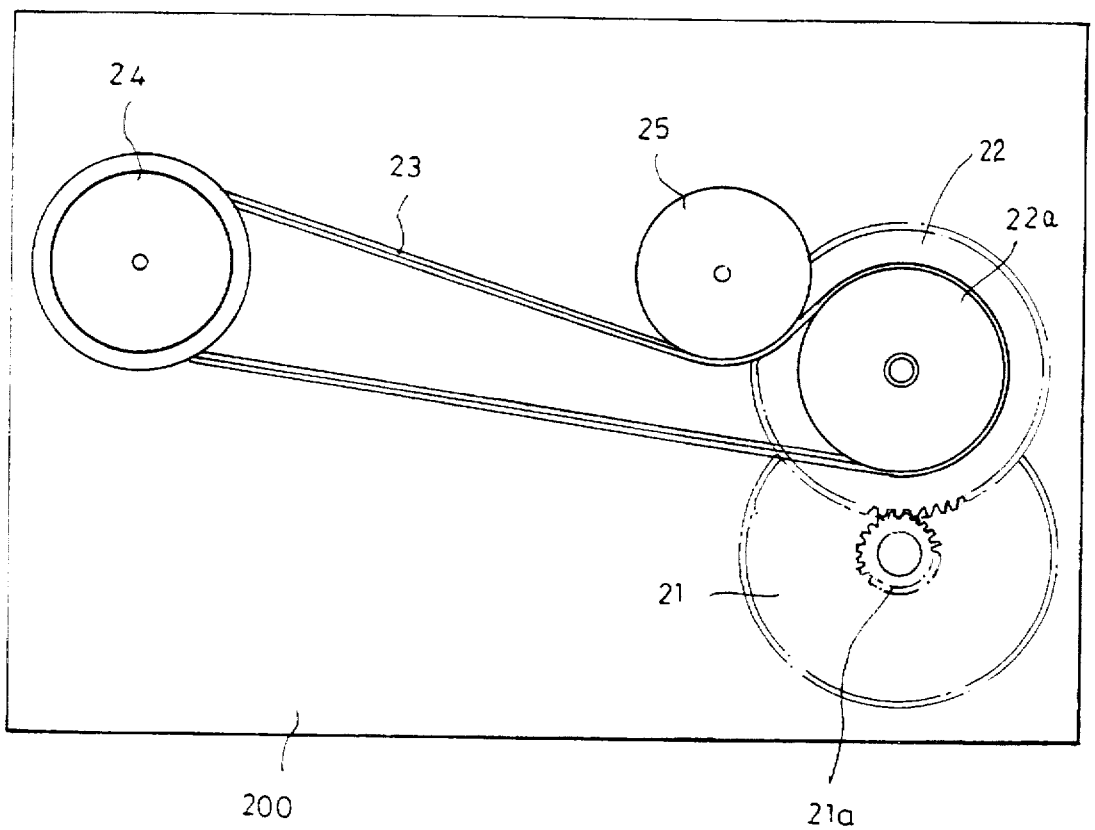
FIG. 3 is a top view showing a driving force transmitting apparatus for a headphone stereo mechanism according to a second embodiment of the present invention.

FIG. 3 shows a construction of the driving force transmitting apparatus for a headphone stereo mechanism according to the second embodiment of the present invention.

As shown therein, a motor 21 is disposed on the lower surface of a main base 200. A drive gear 21a is disposed on a central shaft of the motor 21. In addition, an idler gear 22 having an idler pulley 22a coaxially disposed on the upper surface thereof is intermeshed with the drive gear 21a.

In addition, a forward capstan pulley 25 is disposed at the left side of the idler gear 12, and a reverse capstan pulley 24 is disposed at the left side of the forward capstan 25. Here, the forward capstan pulley 25 is slightly spaced apart from the idler pulley 22a of the idler gear 22. The forward capstan pulley 25 partially covers the idler gear 22, as shown in FIG. 3.

The idler pulley 22a of the idler gear 22, the reverse capstan pulley 24, and the forward capstan 25 are connected by a belt 23.

Here, the idler pulley 22a of the idler gear 22 and the reverse capstan pulley 24 come into contact with the inner surface of the belt 23, whereas the forward capstan pulley 25 comes into contact with the outer surface of the belt 23.

The operation of the driving force transmitting apparatus for a headphone stereo mechanism according to the second embodiment of the present invention will now be explained with reference to FIG. 3.

To begin with, when the motor 21 rotates, the idler gear 22 intermeshed with the drive gear 21a rotates, and the driving gear force of the idler gear 22 is transmitted to the reverse capstan pulley 24 and the forward capstan pulley 25 by the belt 23. Here, the forward capstan 25 rotates in the same direction as the motor, and the reverse capstan pulley 24 rotates in the opposing direction to the rotation direction of the motor 21.

In FIG. 2, the reverse capstan pulley 14 is closer to the idler pulley 12a than the forward capstan pulley 15 is. In FIG. 3, the forward capstan pulley 25 is closer to the idler pulley 22a than the reverse capstan pulley 24 is.

As described above, the driving force transmitting apparatus for a headphone stereo mechanism according to the first and second embodiments of the present invention includes three belt-driven elements of the idler pulley, the reverse capstan pulley, and the forward capstan pulley, thus reducing the motor load compared with the prior art. In addition, since the belt is not directly connected to the motor, the motor does not receive any side driving force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving force transmitting apparatus for a headphone stereo mechanism, comprising:

a motor having a drive gear disposed on a central shaft thereof and disposed at a lower surface of a base;

an idler gear intermeshing with the drive gear of the motor and having an idler pulley coaxially disposed to the idler gear; and a reverse capstan pulley and a forward capstan pulley rotatable by a belt connected to the idler pulley of the idler gear, wherein the idler pulley, the reverse capstan pulley and the forward capstan pulley are driven by the idler gear, and wherein one of the reverse capstan pulley and the forward capstan pulley is positioned a predetermined distance from the idler pulley and partially overlaps the idler gear.

2. The apparatus of claim 1, wherein the idler pulley and the forward capstan pulley come into contact with an inner surface of the belt, and the reverse capstan pulley comes into contact with an outer surface of the belt.

3. The apparatus of claim 1, wherein the idler pulley and the reverse capstan pulley come into contact with an inner surface of the belt, and the forward capstan pulley comes into contact with an outer surface of the belt.

4. The apparatus of claim 1, wherein the reverse capstan pulley is positioned closer to the idler pulley of the idler gear than the forward capstan pulley is.

5. The apparatus of claim 1, wherein the forward capstan pulley is positioned closer to the idler pulley of the idler gear than the reverse capstan pulley is.

6. The apparatus of claim 1, wherein a radius of the idler gear is greater than a radius of the idler pulley.

7. The apparatus of claim 1, wherein the belt is not directly connected to the drive gear of the motor.

8. The apparatus of claim 7, wherein the belt is directly connected to the idler pulley, the reverse capstan pulley and the forward capstan pulley.

9. The apparatus of claim 1, wherein the idler pulley is coaxially disposed on a lower surface of the idler gear.

10. The apparatus of claim 1, wherein the reverse capstan pulley is positioned a predetermined distance from the idler pulley and partially covers the idler gear.

11. The apparatus of claim 1, wherein the forward capstan pulley is positioned a predetermined distance from the idler pulley and partially covers the idler gear.

* * * * *